US008398471B2

(12) United States Patent
Duhamel

(10) Patent No.: US 8,398,471 B2
(45) Date of Patent: Mar. 19, 2013

(54) METHOD AND SYSTEM FOR PROVIDING A FEATURE GAME USING SPATIAL RELATIONSHIP BETWEEN OBJECTS

(75) Inventor: Gerald Duhamel, Drummondville (CA)

(73) Assignee: Labtronix Concept inc., Drummondville (CA)

( * ) Notice: Subject to any disclaimer, the term of this patent is extended or adjusted under 35 U.S.C. 154(b) by 1206 days.

(21) Appl. No.: 11/846,336

(22) Filed: Aug. 28, 2007

(65) Prior Publication Data

US 2008/0058047 A1 Mar. 6, 2008

Related U.S. Application Data

(60) Provisional application No. 60/840,962, filed on Aug. 30, 2006.

(51) Int. Cl.
*A63F 13/00* (2006.01)

(52) U.S. Cl. ................................ 463/11; 463/16; 463/20

(58) Field of Classification Search .................... 463/10, 463/11, 16, 20
See application file for complete search history.

(56) References Cited

U.S. PATENT DOCUMENTS

| | | | | |
|---|---|---|---|---|
| 5,294,128 | A | 3/1994 | Marquez et al. | |
| 5,324,041 | A | 6/1994 | Boylan et al. | |
| 5,431,407 | A | 7/1995 | Hofberg et al. | |
| 5,692,755 | A | 12/1997 | Gutierrez | |
| RE36,739 | E | 6/2000 | Gutierrez | |
| 6,102,403 | A | 8/2000 | Kaufman | |
| 6,196,548 | B1 | 3/2001 | Schaefer | |
| RE37,588 | E | 3/2002 | Ornstein | |
| 6,439,573 | B1 * | 8/2002 | Sklar | 273/292 |
| 6,599,192 | B1 * | 7/2003 | Baerlocher et al. | 463/25 |
| 2003/0008705 | A1 * | 1/2003 | Baerlocher et al. | 463/20 |
| 2003/0104852 | A1 * | 6/2003 | Duhamel | 463/13 |
| 2005/0032565 | A1 | 2/2005 | Chang et al. | |
| 2005/0049038 | A1 | 3/2005 | Cuddy et al. | |
| 2005/0054411 | A1 | 3/2005 | Hughs-Baird et al. | |

FOREIGN PATENT DOCUMENTS

CA 1307589 2/1989

* cited by examiner

*Primary Examiner* — Milap Shah
*Assistant Examiner* — Lawrence Galka
(74) *Attorney, Agent, or Firm* — Benoît & Côté

(57) ABSTRACT

Embodiments and methods for conducting a game are herein provided. The method comprises providing a representation of a plurality of game indicia having spatial relationship with each other, one of the game indicia being designated as a reference game indicium. It further comprises receiving a player input corresponding to a guess regarding the spatial relationship of an other location with respect to the reference location, the other location being from the plurality of locations. The method further comprises revealing the other location to the player, evaluating the player input as either correct or incorrect, and evaluating fulfillment of a game-ending criterion. Based on evaluation, the game either continues or an outcome is evaluated to finally provide an award to the player. Physical embodiments comprise gaming machines and gaming program adapted for either conducting the game or causing the game to be conducted.

14 Claims, 9 Drawing Sheets

3 LINES : 500 CREDITS
2 LINES : 100 CREDITS
1 LINE : 20 CREDITS
NO LINE : 5 CREDITS

METHOD AND SYSTEM FOR PROVIDING A FEATURE GAME USING SPATIAL RELATIONSHIP BETWEEN OBJECTS

CROSS-REFERENCE TO RELATED APPLICATIONS

The present application claims priority under 35 U.S.C. §119(e) of U.S. Provisional Patent Application No. 60/840,962 filed on Aug. 30, 2006 and entitled METHOD AND SYSTEM FOR PROVIDING A FEATURE GAME USING SPATIAL RELATIONSHIP BETWEEN OBJECTS. The specification of the foregoing Provisional Patent Application is hereby incorporated by reference.

SUMMARY

An embodiment described herein provides a method of providing a feature game. The method comprises the steps of providing a representation of a plurality of game indicia having spatial relationship with each other, one of the game indicia being designated as a reference game indicium. It further comprises receiving a player input corresponding to a guess regarding the spatial relationship of an other location with respect to the reference location, the other location being from the plurality of locations. The method further comprises revealing the other location to the player, evaluating the player input as either correct or incorrect, and evaluating fulfillment of a game-ending criterion. If the game-ending criterion is not fulfilled, the method further comprises designating the other location as the reference location, and repeating the steps of receiving a player input, revealing the other location, evaluating the player input, and evaluating fulfillment of the game ending-criterion once again. If the criterion is fulfilled, the method further comprises performing an outcome evaluation and providing an award to the player.

Another embodiment described herein provides a gaming machine comprising: evaluating means accepting means, inputting means, displaying means, controlling means and awarding means. The controlling means is adapted to conduct a game according to at least one embodiment described herein, the controlling means conducting the game in relation with the other components of the gaming machine.

Yet another embodiment described herein provides a gaming program, embodied on a computer readable medium or in processor-readable memory, having codes that, when loaded in memory of a processing device, causes the processing device to conduct a game according to at least one embodiment described herein.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

In relation with the present application, the terms "symbols", "cards", "game indicia" or any variations of these terms designate the same concept: an object or illustration of an object of any suitable form having a spatial location, thus a spatial relationship with at least another one. Depending on embodiments, the symbols, cards or game indicia may have an intrinsic value influencing either the conduct or the outcome of the feature game.

The term "location" is intended, for its part, to refer to relative spatial relationships between elements.

The term "reference", particularly in relation with "reference location" refers to one location being used as a temporary reference mark for the evaluation of at least one player input.

Figure 1:
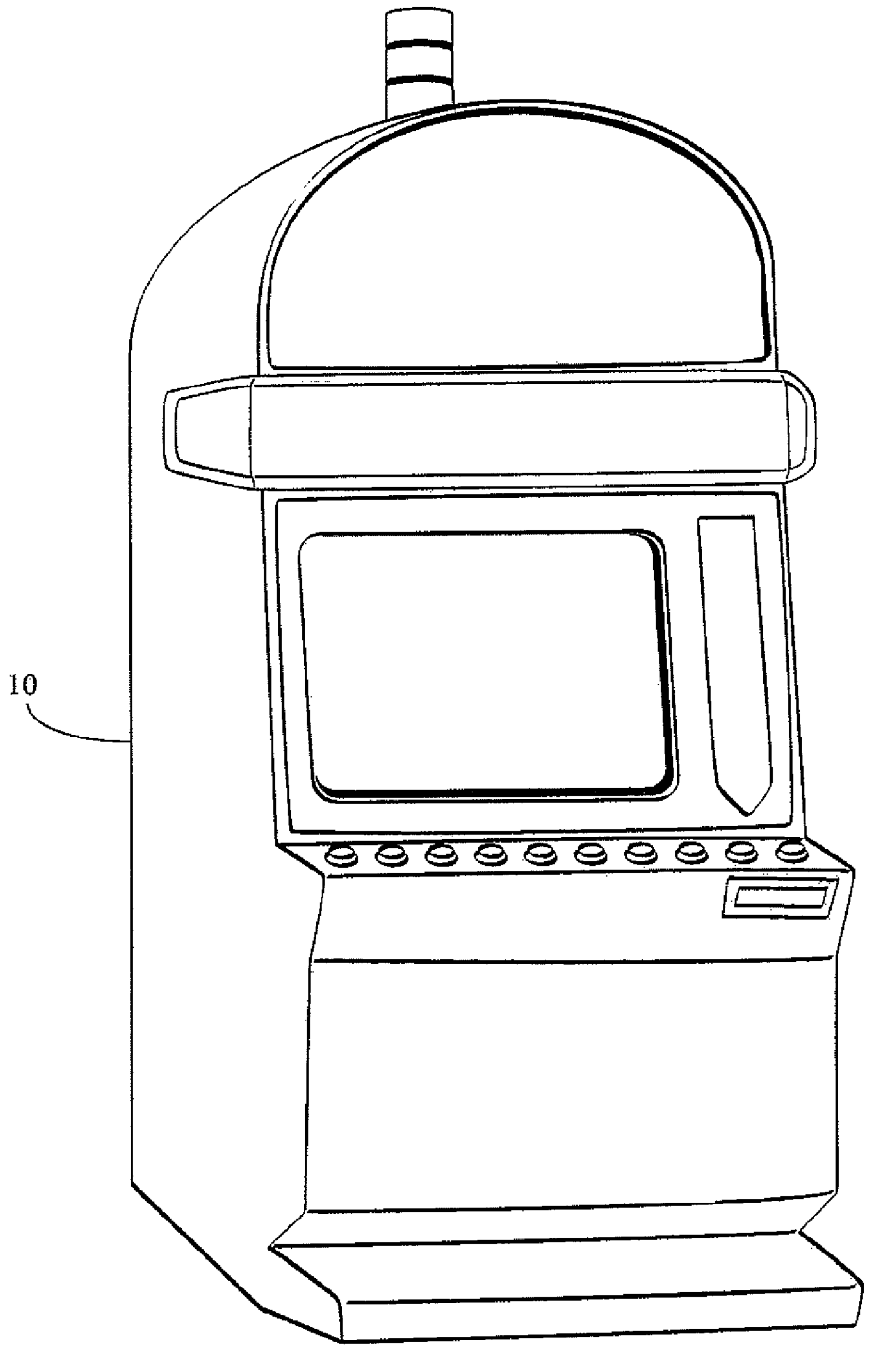
FIG. 1 is a schematic diagram showing a perspective view of a gaming machine suitable for the embodiments described herein.
Figure 2:
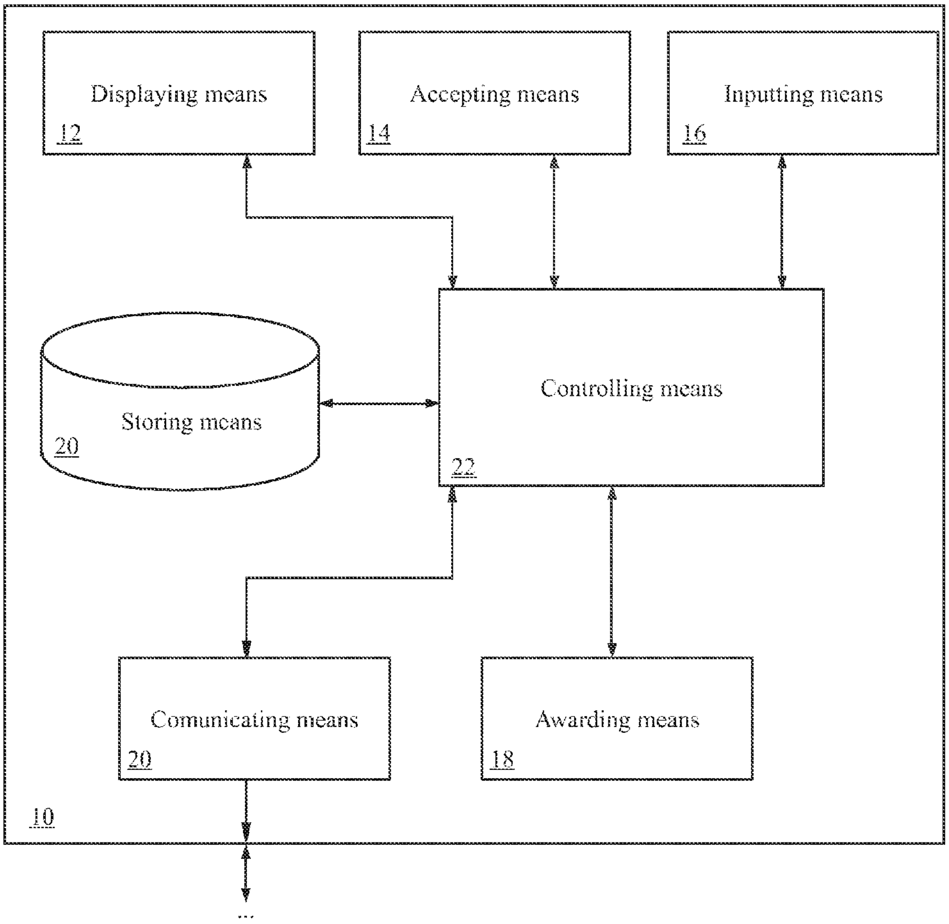
FIG. 2 is a block diagram illustrating the components of the gaming machine of FIG. 1.

Embodiments described herein may be carried out on a gaming machine, as illustrated in FIGS. 1 and 2. Said gaming machine 10 comprises displaying means 12, such as one or more video screen or LCD screen, or mechanical reels; accepting means 14 such as a card reader, or a coin and/or bill acceptor; inputting means 16, such as buttons, levers or a touch screen; awarding means 18, such as a ticket printer, a card reader or a hopper; storing means 20 such as RAM, flash memory, a hard drive or a removable memory medium, and controlling means 22 such as a computer, computer codes, or a hardware controller. The controlling means 22 comprises evaluating means 24 and modifying means 26, which also may correspond to a computer, computer codes or hardware components. In another embodiment, the gaming machine 10 comprises either in replacement of or in combination with the accepting means 14 communicating means 28 allowing communication between the controlling means 22 and a remotely linked accounting means (e.g. electronic fund transfer server) wherein player accounts are maintained, and credits are downloaded on the gaming machine 10 and uploaded on the accounting means when appropriate; the downloaded credits being used by a player on the gaming machine.

Figure 3:
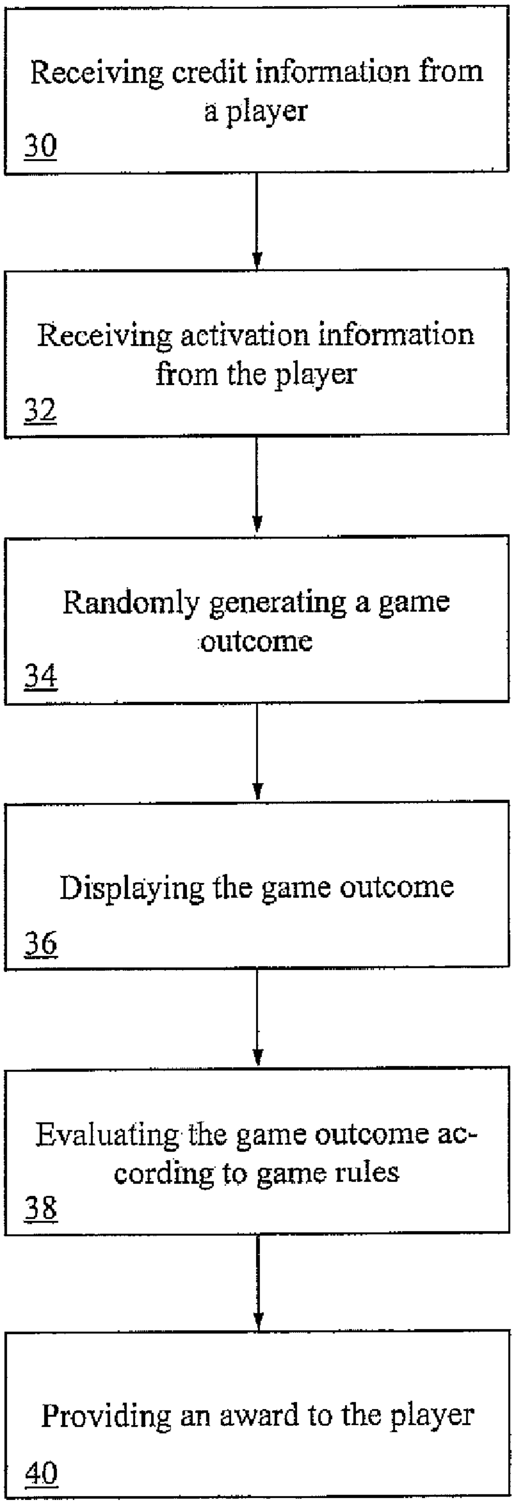
FIG. 3 is a flowchart illustrating the steps of a game process as played on the gaming machine of FIGS. 1 and 2.

Such a gaming machine 10 is designed, as shown on FIG. 3, to receive credit information from a player (at step 30) either in a physical format (such as coins or bills) or in an electronic format (such as a player card or a money transfer from a bank account), to receive activation information from the player (at step 32), to randomly generate (at step 34) and display (at step 36) a game outcome, to evaluate said game outcome according to game rules (a pay table for example) (at step 38), and to award a prize to the player for a winning game outcome (at step 40). Such a game prize may take the form of a monetary amount, or a participation in a feature game for example.

In other embodiments, the method described herein may also be implemented on a computer program, or at a remote terminal, game information being distributed via a network, such as communicatively linked machines or the Internet, or broadcasted using an electrical or electromagnetic signal. In these embodiments, game information necessary to perform the whole game process or uniquely specific game information may be distributed via a network or broadcasted. In some embodiments, a portion of the information (a game core application) may be maintained locally in the gaming machine while the transmitted or broadcasted information completes the game core application to conduct the feature game.

The controlling means 22 is adapted to perform steps associated with embodiments described herein. Therefore, a gaming machine comprising such an adapted controlling means 22 may provide to a player a feature game according to embodiments described herein.

Embodiments described herein may also be provided as methods of conducting feature games. Therefore, the following embodiments disclose such method embodiments that may be performed on any of the above physical embodiments (gaming machines, gaming terminals, general computers, system components and/or other described devices).

An embodiment of the method described herein consists in a bonus feature game being conducted on a gaming machine following occurrence of a triggering event.

According to embodiments, occurrences of the triggering event may depend on one more specific outcome in the game in relation with or regardless of the bet level placed by the player in the primary game. According to other embodiments, the occurrence of the triggering event may depend on the accumulation of information over a plurality of game outcomes, thus over a plurality of plays of the primary game. Other embodiments include a network-gaming-machine controlled triggering event such as a gaming machine transmitting a triggering event signal to one or more qualified networked gaming machine, or the network controller controlling the transmission of such a triggering event signal upon determination of a triggering condition being fulfilled on one networked gaming machine. Other embodiments include the network controller signaling one or more networked gaming machines upon fulfillment of specific network conditions such a counter reaching a predetermined trigger value or server-controlled triggering probabilities of a plurality of gaming machines. Therefore, many embodiments are available to determine when to signal triggering event(s) and which gaming machine(s) would receive such triggering event(s).

In the present embodiment, a primary game is played in which a specific outcome is determined to be the triggering event.

Examples of such primary games and triggering events may be: i) a poker game with the occurrence of a particular outcome (any four-of-a-kind poker hand) triggering the bonus feature; and ii) a line game using reels with the occurrence of a particular symbol among the line game symbols, a particular combination of symbols in the outcome, or a particular symbol or symbol combination according to a particular location or combination of locations in the line game. Other examples comprise: iii) a primary game in association with which a counter that is increasing as particular events occurs in the primary game, with the counter reaching a predetermined outcome resulting in the initiation of the bonus feature; and iv) any game being able to detect a bonus feature initiation signal (a triggering event) generated by the gaming machine or transmitted by a communicatively-linked remote device (e.g. a server). According to embodiments, parameters controlling the initiation of the bonus feature may comprise alone or in combination: i) the number of pay lines activated by the player in a line game, ii) the value of the wager level placed by the player either globally or per active pay line; iii) centrally controlled data such as a centrally accumulated credit value for a network of gaming machines achieving a predetermined outcome; and iv) player identification and/or player associated data in a player tracking system.

Figure 4A:
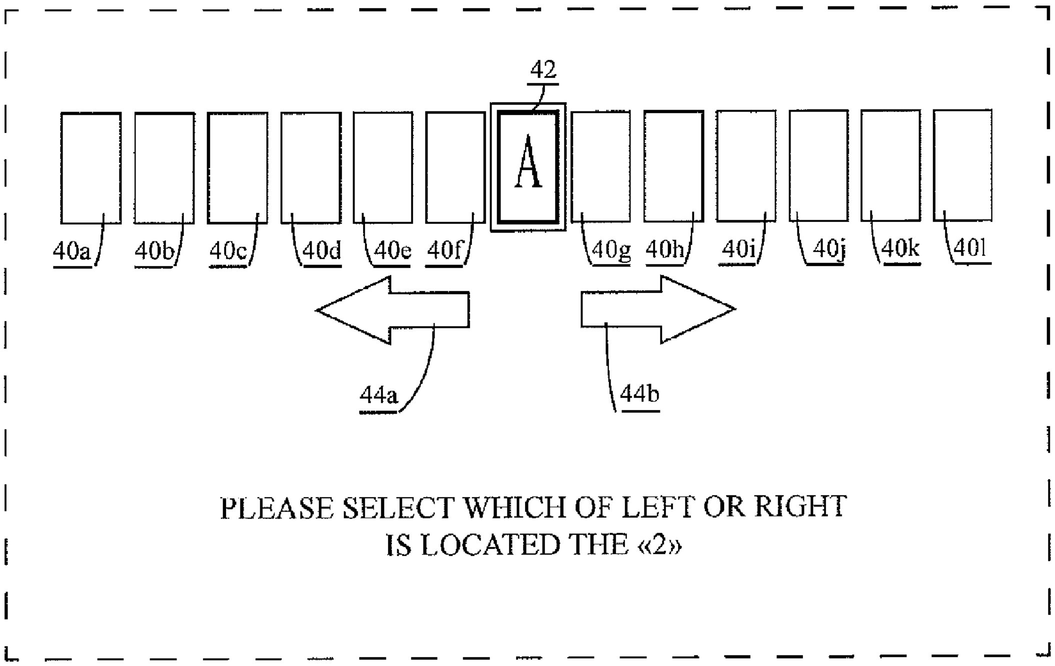
FIGS. 4*a* and 4*b* are representations illustrating states in a bonus feature game in accordance with an embodiment described herein.
Figure 4B:
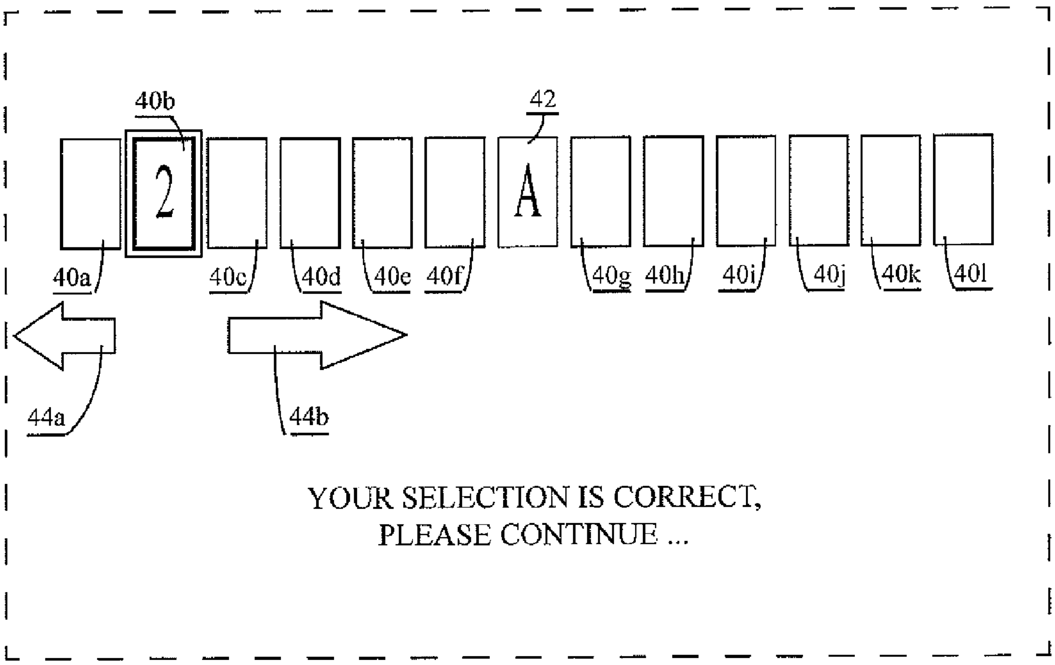

In the present described embodiment, a bonus feature game is initiated upon occurrence of the triggering event. This bonus feature game takes place in a new game presentation (illustrated on FIGS. 4*a* and 4*b*) replacing the primary game representation. The representation of the bonus feature game takes the form of an array of twelve face-down cards 40*a*-1 (having values ranging from Two to King) and a thirteenth card 42 disposed in the center of the array (the reference location) having an Ace value and being revealed to the player. As illustrated on FIG. 4*a*, the player is invited to provide a guess input regarding the next card in the standard sequence as being either located left or right of the Ace using the input controls 44*a* and 44*b*. Following, as illustrated on FIG. 4*b*, the location and value of the other card in the sequence (the Two) is revealed; this location 40*b* becoming the new reference location. If the player's guess input is correct, the bonus feature game continues. He (or she) must then provide a guess input regarding which side (left or right) of the new reference location (the location of the Two) is the next card in the sequence (the Three). If the guess input is evaluated as incorrect, the player is awarded a bonus prize based on the outcome achieved in the bonus feature game. If the player provides only correct guess inputs throughout the twelve (12) cards (i.e. the Two to the King value cards), the game ends with the player being awarded the highest-value prize.

Figure 5:
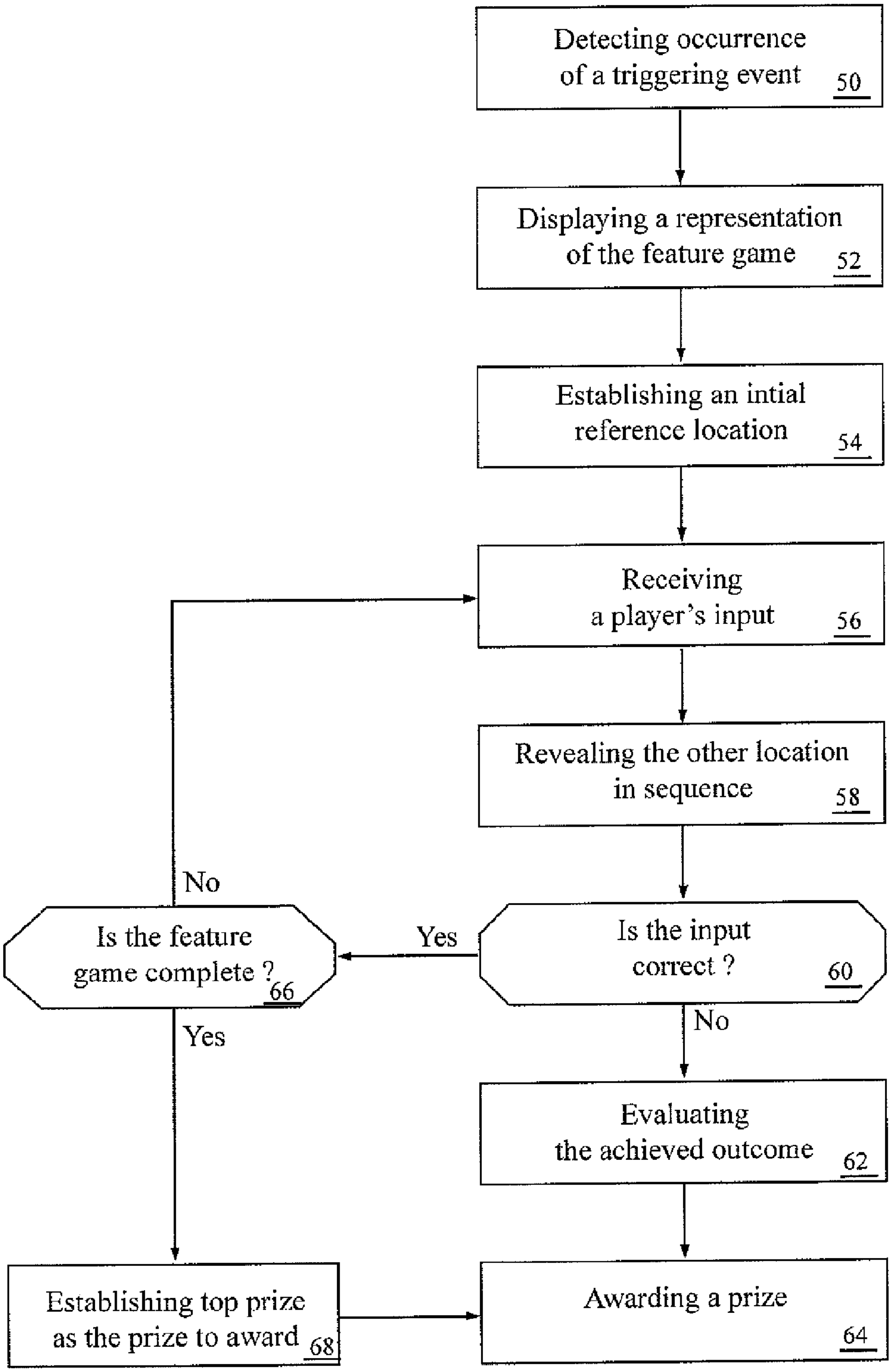
FIG. 5 is a flowchart illustrating the steps of a bonus feature game played in accordance with an embodiment described herein.

Flow chart of FIG. 5 illustrates the steps taking place during the conduct of the feature game. To start, the gaming machine detects occurrence of a triggering event (at step 50) and modifies the game representation to illustrate the bonus feature game (at step 52) wherein a plurality of locations takes place. In relation with embodiments of the invention, plurality of locations means more than two locations since necessitating providing the player with an option and at least two steps. The central location is set as the initial reference location (at step 54). The player is invited to provide a guess input: either left or right is the next location in the sequence (at step 56) according to the current reference location. The next location in the sequence is identified, with that other location becoming the new reference location (at step 58). Evaluation of whether the guess input is correct or not is performed (at step 60). If the input is incorrect, evaluation of the achieved outcome is performed and a prize is set accordingly (at step 62). The player is awarded that prize (at step 64). If the input is correct, evaluation of whether the feature game is completed is performed (at step 66) with the player being awarded the top prize (established at step 68) upon positive evaluation. If the feature game is not completed, the player is invited to provide a further guess input (at step 56), followed with those step 58 and following.

In different embodiments, different criteria are used to determine when to end the bonus feature game and further the prize to award in that bonus feature game. Such criteria used to determine when the bonus feature game ends comprise a) the reaching of a predetermined number of wrong guess inputs over one; b) the reaching of a randomly determined number of wrong guess inputs; c) the reaching of a predetermined number or randomly determined number of right guess inputs; and d) the achievement of a player-selected criterion to provide a few. Of course, information from the primary game may influence the above criteria (e.g. modifying the numbers of allowed incorrect guess inputs and/or their probabilities).

Criteria in regards to determination of the prize may comprise a) the number of correct guess inputs; b) the number of inputs necessary to reach a level; c) the reaching of a monitored level or a set number of monitored levels; d) amount placed in stake in relation with the play of the bonus feature game, etc.

Figure 6:
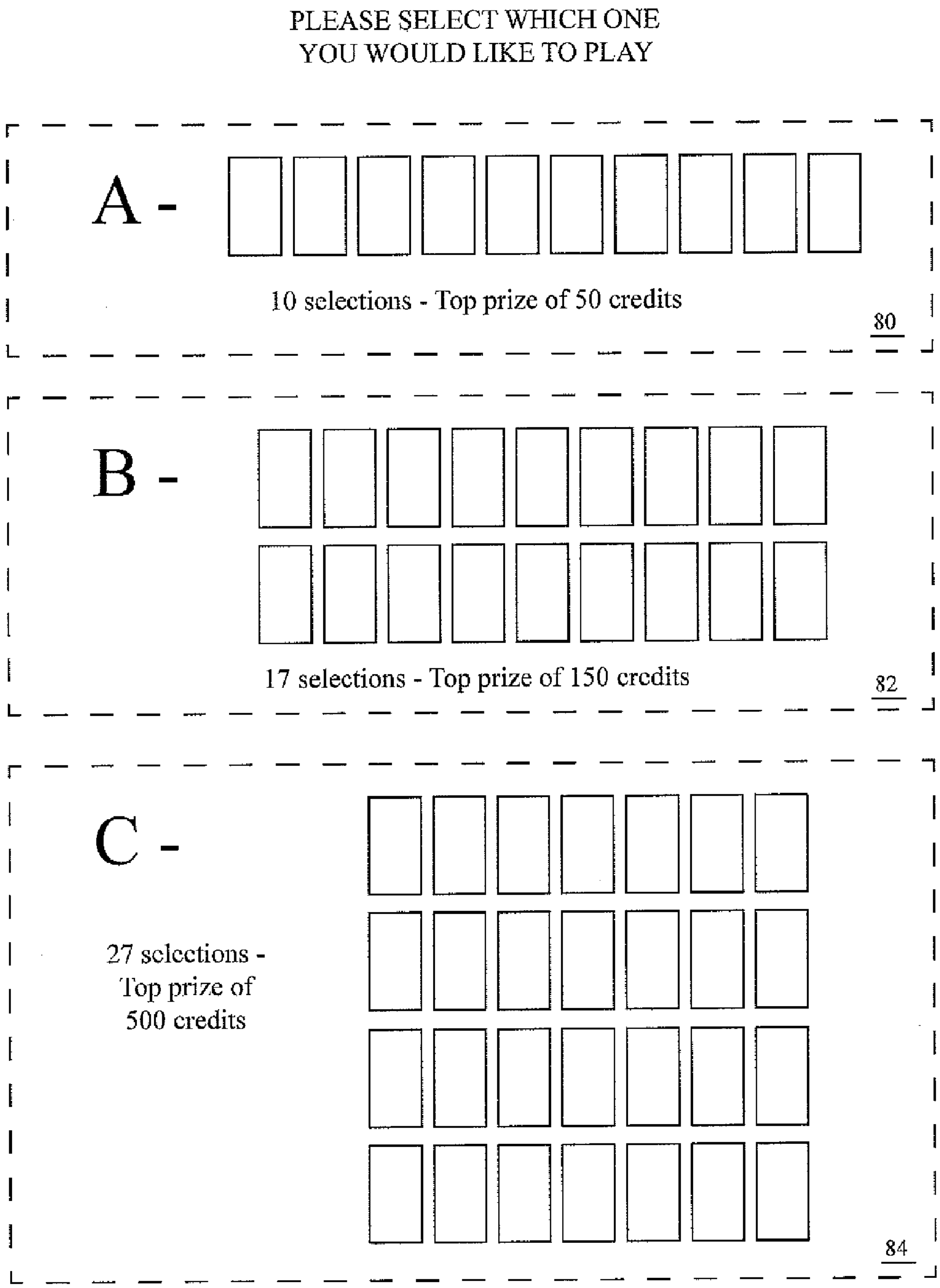
FIG. 6 is a representation illustrating an interface for a selection process in relation with a bonus feature game in accordance with an embodiment described herein.
Figure 7:
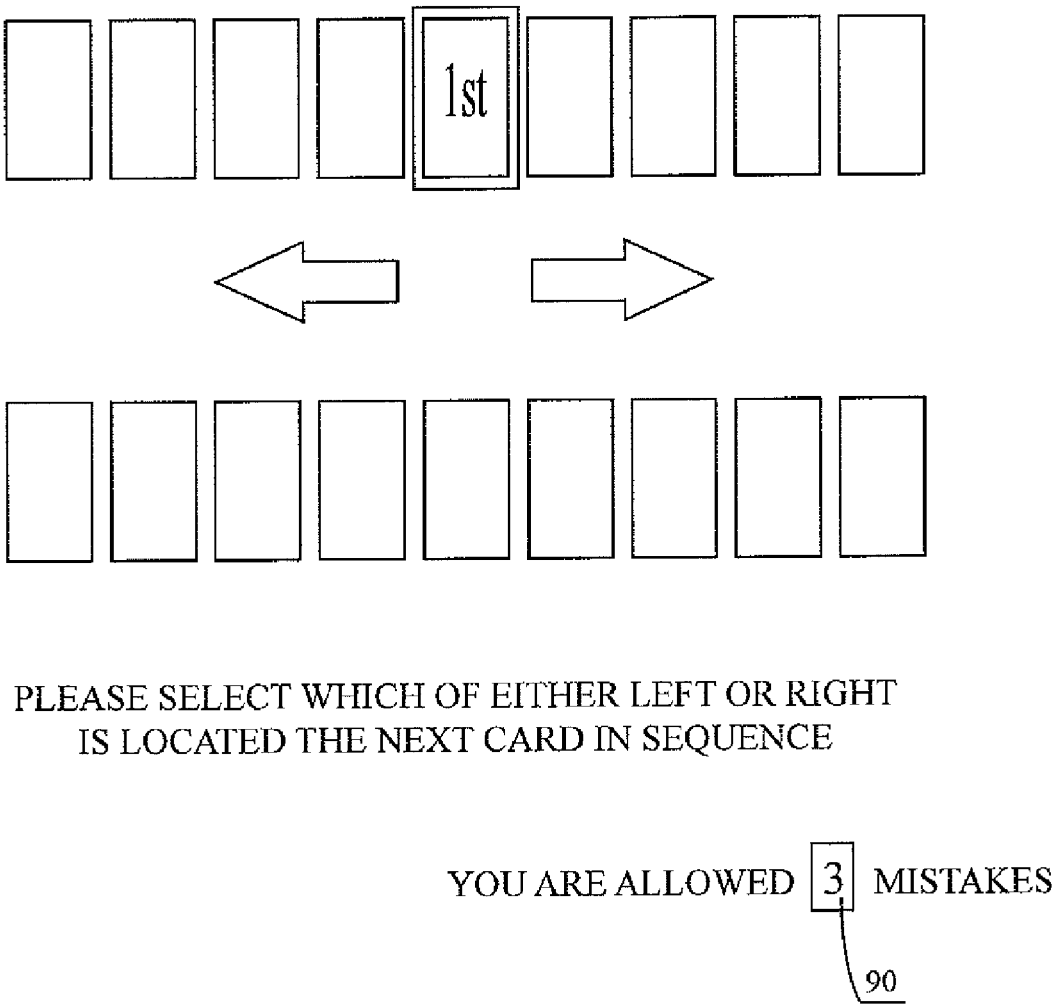
FIG. 7 is a game representation during the conduct of a bonus feature game in accordance with an embodiment described herein.

In another embodiment embodying alternative criteria described above, the player enters the bonus feature game upon occurrence of the triggering event. At the beginning of the bonus feature game, the player is invited to select a goal, with the prize associated with the goal increasing along with the difficulty to achieve the selected goal. FIG. 6 illustrates that game interface wherein the player must select between Option A 80, Option B 82 and Option C 84, each having associated specific feature configurations. In the present bonus feature game, the player must select from one (1) to four (4) arrays of symbols he (or she) must successfully pass through to be awarded a successful prize. If the player does not achieve the selected goal, the player is awarded a consolidation prize. Following the goal selection, the player is provided with a limited (randomly determined) number of allowed incorrect guess inputs. Each time a player's input is incorrect, the counter decreases. FIG. 7 illustrates the feature game representation in the case the player would have selected the Option B 82, counter 90 indicating a number of allowed incorrect inputs. As the play progresses, continuous monitoring of the depletion of the counter and the achievement of the goal is performed. Upon monitoring of the occurrence of any one of the two, the player is provided with the corresponding prize and taken back to the primary game.

In relation with the two previous embodiments, the mathematical statistics driving the bonus feature game may vary. In one embodiment, the location of the symbols, or in other words the sequence of the symbols, to be revealed or selected may be predetermined. Accordingly, a sequence table would be defined prior to the beginning of the play of the bonus feature game as illustrated in Table 1 in which the columns of data indicate the location identification (0 being the center location and the value increasing moving further to the right and decreasing moving further to the left), the symbol value displayed in the location, and the sequence of locations to be used as reference locations.

TABLE 1

| Card value | Sequence | Location |
|---|---|---|
| As | 0 | 0 |
| 2 | 1 | −4 |
| 3 | 2 | +2 |
| 4 | 3 | +6 |
| 5 | 4 | −5 |
| 6 | 5 | −1 |
| 7 | 6 | −6 |
| 8 | 7 | +5 |

TABLE 1-continued

| Card value | Sequence | Location |
|---|---|---|
| 9 | 8 | +3 |
| 10 | 9 | −3 |
| Jack | 10 | +1 |
| Queen | 11 | +4 |
| King | 12 | −2 |

In another embodiment, the sequence of the locations to be selected may be randomly selected throughout the play of the bonus feature game. The probabilities may, in one embodiment, be the natural probabilities. Thus, each location or symbol in the present embodiment has the same probability to be the next one to be the reference location. It results from that that the player has an instinctive understanding of his probabilities of providing a right guess input based on the actual game representation. In one embodiment, the random selection is performed hidden from the player, while, in other ones, the player either witnesses the selection process or even participates in that selection process. For example, a wheel may be used to determine the next symbol to determine the reference location through that symbol being borne by that location. Another example is a selection process wherein the player selects a hidden-value symbol among symbols, and the selected symbol is used to determine the reference location.

In another embodiment, the probabilities are unevenly distributed. The probabilities, furthermore, are varying during the play of the bonus feature. Therefore, probabilities of providing a right guess input may differ from what can be understood from the game representation. Therefore, it may be possible to set the difficulty level to a desired level without the player knowing it. Table 2 illustrates an example of such a way to manage probabilities throughout the play. "Step #" identifies the current state of the feature. "Prob. Correct" identifies the set probabilities for the player to provide the correct input at that step. "Remaining probabilities" identifies what should be the product of the remaining probabilities to result in the overall success probabilities set at step 0. According to physical environment, it should be known that probabilities of one hundred percent (100%) of correct input must be available to be set when the reference location is at one end or the other according to special relationship.

TABLE 2

| Step # | Prob. Correct | Remaining prob. |
|---|---|---|
| 0 | | 15.36% |
| 1 | 80% | 19.20% |
| 2 | 50% | 38.40% |
| 3 | 80% | 48.00% |
| 4 | 100% | 48.00% |

Another tool available to control the difficulty of the game is the determination of the first reference location. If the first reference location is in the center and the weights are evenly distributed, the player has a probability of fifty percent (50%) to provide a right guess input. When the first reference location is placed closer to any of the two extremities, the probabilities are less evenly distributed up to a ratio of one hundred percent (100%)/zero percent (0%) if the reference location is one of the far left or far right location.

In above embodiments, a location selected has a reference location becomes unavailable for further selections. Therefore, an elimination process takes place wherein the obvious goal is to eliminate all locations without wrong guess inputs.

In other embodiments, locations may remain available for one or more further selections. Therefore, the objective of the feature game may remain an elimination process with some kind of pull-back process, or may constitute a right guess counting process for example.

Figure 8:
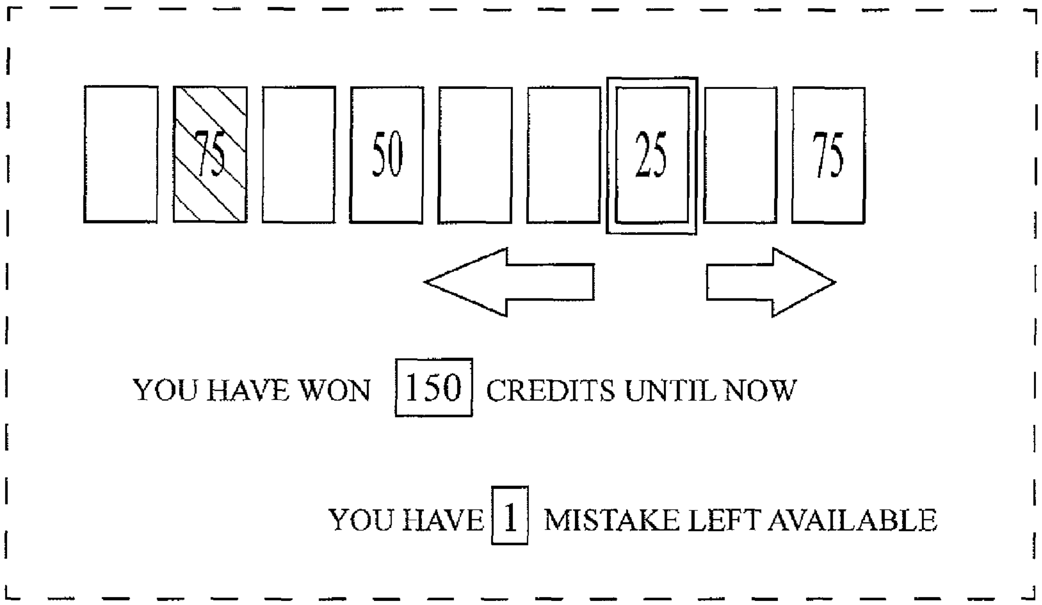
FIG. 8 is another game representation during the conduct of a bonus feature game in accordance with an embodiment described herein.

In another embodiment, the player may perform a limited number of incorrect guesses before the end of the bonus feature game. Furthermore, each time an object is designated, an associated value is revealed. Therefore, two counters are used: an incorrect guess counter depleting each time an incorrect guess input is entered, and a credit counter tallying the value of the objects revealed with each correct guess. FIG. 8 illustrated such an embodiment. The process switches to the evaluation step when the first one of: a) the incorrect guess counter is totally detected; and b) all possible guess inputs have been performed. The player is then awarded the current value tallied in the credit counter.

Figure 9:
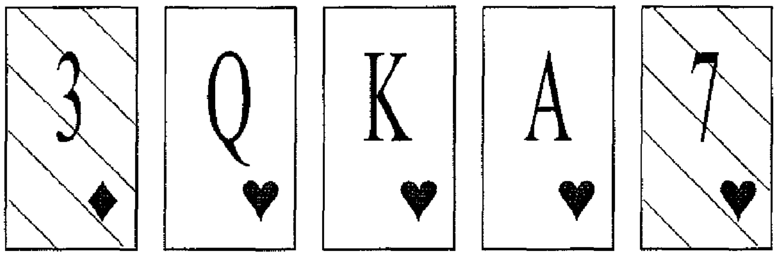
FIG. 9 is a representation of an evaluation outcome resulting from the conduct of a bonus feature game in accordance with an embodiment described herein.

In another embodiment, the bonus feature presents a matrix of thirty-six face-down objects concealing symbols. The matrix consists in six arrays and six rows. At the beginning, a first location is identified in a start reference location, and the player must, for each new object, provide a guess input between left, right, up and down. The player gathers in a hand the symbols revealed when the player performs correct guesses up to a maximum number of symbols. If the player performs a predetermined number of incorrect guesses before achieving the maximum number of symbols, the process ends. Afterwards, the symbols gathered in the hand are evaluated to establish a prize to award to the player. In the present embodiment, card symbols are gathered in the hand, which are evaluated at the end as the best available five-card poker hand. In that embodiment, up to eight cards can be gathered. In another embodiment, the player, after having gathered five cards, may reject none, some or all of them, and continue providing inputs to complete the five-card hand. FIG. 9 illustrates such a game embodiment during the conduct of the feature game, when the player is holding cards. The hand is evaluated when complete, or when the available number of wrong inputs is depleted, according to the first to occur.

In another embodiment, the process takes place using the main display of a five-reel line game. Upon occurrence of a triggering symbol (a Question Mark symbol), the feature game begins. The player is thereafter invited to guess whether the next designated symbol will appear left or right of the location of the Question Mark symbol and afterwards the location of the last designated location. Designation of a location in the same column as the currently reference location may either be prevented, evaluated as a correct guess or evaluated as an incorrect guess according to game rules. The player is awarded a prize based on either the nature of the correct guesses, the value of the correct guesses if values are revealed to replace symbols or the number of correct guesses when the feature game ends.

Figure 10:
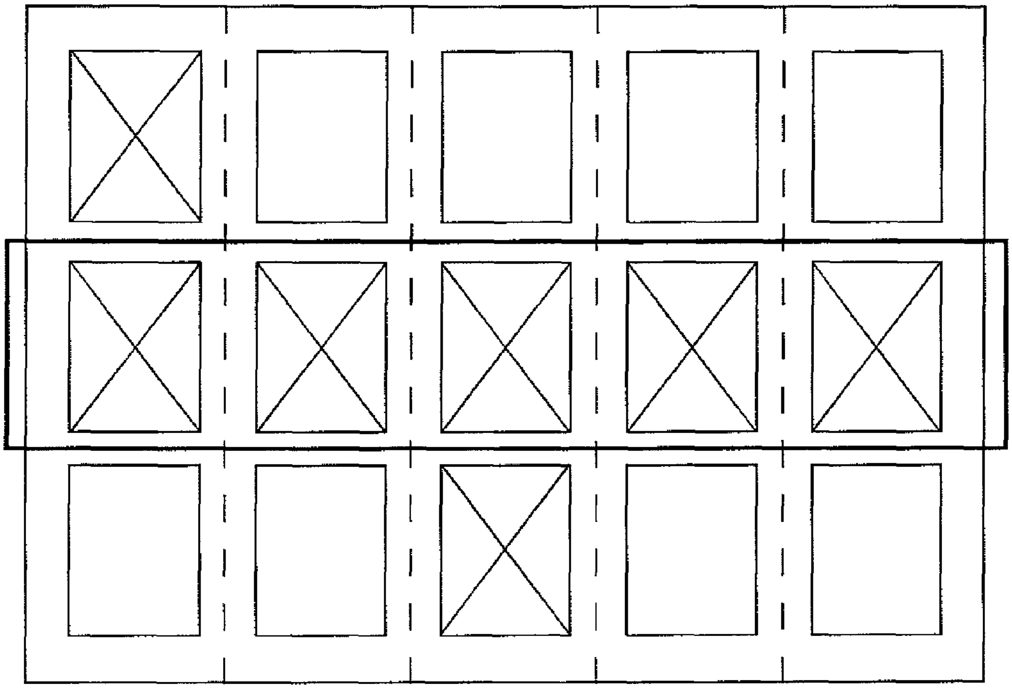
FIG. 10 is a representation of an evaluation outcome resulting from the conduct of another bonus feature game in accordance with an embodiment described herein.

In another embodiment, upon evaluation of a correct guess, the symbol is replaced with an X symbol. Upon evaluation of an incorrect guess, the symbol is simply removed leaving an empty space in the game matrix. The process ends when all of the symbols have taken part in the feature game, thus when only X symbols and empty spaces remain. The evaluation of the feature game outcome comprises to evaluate if the X symbols form one or a plurality of patterns (X pattern, a column, a line, etc.), with the value of the prize awarded being established accordingly. FIG. 10 illustrates an outcome of a game feature as described in the present embodiment with the prize being established based on the number of complete X-marked lines.

According to the evaluation process and criteria being established for that evaluation, the indicia used in the feature game may be all identical, may have values illustrating the sequence, may have values significant with regards to the prize to award, or may have values having no signification by themselves but only when assembled for their evaluation (card values, symbols, colors, etc.). The nature of the used indicia therefore depends solely on the desired incentive and the selected evaluation process.

In other embodiments, similar feature games may be provided as primary wagering games. Therefore, the feature game may require a monetary input, a wager, from a player, and the prize value awarded at the end depending in part on the value of that wager. Depending on the game outcome, the player potentially winning nothing.

Even though above embodiments present awarding monetary prizes to players in relation to the present feature games, other forms of rewards may also be used. Examples of such alternative rewards may comprise: points, participations in feature games, non-cashable credits, progressive prizes, gifts, vouchers redeemable in multiple forms, and comps.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the embodiments described herein can be carried out as a method, can be embodied in variable devices or a system, a computer readable medium, processor-readable memory or an electrical or electro-magnetic signal.

The embodiments described above are intended to be exemplary only. Their scope is therefore intended to be limited solely by the scope of the appended claims.

I claim:

1. A method of conducting a feature game played by a player on a gaming machine, the method comprising:

(a) providing, using a display means of the gaming machine, a representation of locations as an array, wherein each location has a position within the array, the locations having a spatial relationship with each of the other locations, and one of said locations of the array is designated as being a reference location;

(b) establishing a sequence for the locations of the array, the sequence establishing one subsequent location with respect to the reference location and at least one non-subsequent location with respect to the reference location, wherein the sequence of locations, being unknown by the player, is stored in a memory of the gaming machine;

(c) receiving from the player through an inputting means of the gaming machine a guessed spatial relationship of the subsequent location with respect to the reference location;

(d) revealing on the displaying means to the player the location in the array of the subsequent location according to the sequence stored in the gaming machine memory and consequently the spatial relationship of the subsequent location with respect to the reference location, namely an actual spatial relationship;

(e) evaluating the guessed spatial relationship as either correct or incorrect based on a comparison to the actual spatial relationship; and (f) evaluating fulfillment of a game-ending criterion, wherein non-fulfillment of the game-ending criterion results in:

(g) changing the reference location by designating the subsequent location which is last revealed as the reference location, the newly-designated reference location having a position different from the previously-designated reference location in the array, thereby generating new player perceivable probabilities of providing a correct player input when guessing of a spatial relationship of a new subsequent location with respect to the newly-designated reference location; and (h) repeating at least once the steps (c) to (f) using the reference location which is last designated;

while fulfillment of the game ending criterion results in:

(i) performing an outcome evaluation of the game against a pay schedule stored in the memory; and (j) providing an award to the player based on the outcome evaluation of the game.

2. The method of claim 1, further comprising:

(k) illustrating in a distinctive fashion throughout the conduct of the method at least two of:

the reference location, the one or more locations among the plurality of locations that can be the subsequent location, the zero or more locations among the plurality locations that cannot be the subsequent location, and the subsequent location.

3. The method of claim 1, wherein the performing an outcome evaluation of the feature game comprises at least one of:

evaluating the number of correct inputs;

evaluating the number of incorrect inputs;

evaluating value of indicia corresponding to said subsequent locations;

evaluating value of indicia corresponding to said subsequent locations resulting from correct inputs;

evaluating a combination of indicia corresponding to said subsequent locations;

evaluating a combination of indicia corresponding to said subsequent locations resulting from correct inputs; and evaluating at least one location resulting from at least one correct input.

4. The method of claim 1, further comprising at least one of:

determining a number of allowed incorrect inputs prior to the beginning of the feature game;

determining a maximum number of player inputs prior to the beginning of the feature game; and determining a goal influencing the conduct of the feature game following its determination.

5. The method of claim 1, further comprising at least one of:

using a structure of a primary game in order to conduct the feature game, the structure being used to provide the representation of a plurality of locations according to the step (a); and generating a game structure distinct from the game structure of the primary game in order to conduct the feature game.

6. The method of claim 1, wherein the player's input is a selection between at least two options, wherein one option is opposed from the other according to their spatial relationship.

7. The method of claim 1, further comprising:

conducting a primary game; and conducting the feature game upon detection of a trigger event.

8. The method of claim 7, wherein the conduct of the feature game is influenced by at least one of:

an outcome of the primary game;

game data resulting from the conduct of a plurality of plays of the primary game; and a player's selection of a configuration in the primary game.

9. The method of claim 1, further comprising:

receiving a wager value from a player; and calculating the prize based at least in part on the wager value.

10. The method of claim 1, further comprising:

detecting a triggering event, comprising one of:

receiving the triggering event signal;

detecting a particular outcome or status of the gaming machine in which a primary game is conducted, said outcome or status being associated with the triggering event.

11. The method of claim 1, further comprising controlling the probabilities of awarding a prize and/or the value of the prize to award through at least one of:

controlling the probabilities of selection of the other location;

controlling the number of allowed incorrect inputs; and controlling the number of inputs to receive from the player.

12. A gaming machine comprising:

controlling means to control the conduct of a game comprising the steps of:

(a) providing using a displaying means of the gaming machine a representation of locations as an array, wherein each location has a position within the array, the locations having a spatial relationship with each of the other locations, and one of said locations of the array is designated as being a reference location;

(b) establishing a sequence for the locations of the array, the sequence establishing one subsequent location with respect to the reference locations and at least one non-subsequent location with respect to the reference locations, wherein the sequence of locations, being unknown by a player, is stored in a memory of the gaming machine;

(c) receiving from the player through an inputting means of the gaming machine a guessed spatial relationship of the subsequent location with respect to the reference location;

(d) revealing on the displaying means to the player the location in the array of the subsequent location according to the sequence stored in the gaming machine memory and consequently the spatial relationship of the subsequent location with respect to the reference location, namely an actual spatial relationship;

(e) evaluating the guessed spatial relationship as either correct or incorrect based on a comparison to the actual spatial relationship; and (f) evaluating fulfillment of a game-ending criterion, wherein non-fulfillment of the game-ending criterion results in:

(g) changing the reference location by designating the subsequent location which is last revealed as the reference location, the newly-designated reference location having a position different from the previously-designated reference location in the array, thereby generating new player perceivable probabilities of providing a correct player input when guessing of a spatial relationship of a new subsequent location with respect to the newly-designated reference location; and (h) repeating at least once the steps (c) to (f) using the reference location which is last designated;

while fulfillment of the game ending criterion results in:

(i) performing an outcome evaluation of the game against a pay schedule stored in the memory; and (j) providing an award to the player based on the outcome evaluation of the game;

accepting means for receiving a wager from the player to allow participation in said game;

the inputting means for receiving player inputs from the player at least at the step (c), these inputs being evaluated by the controlling means throughout the conduct of the game;

the displaying means for displaying a representation of the game to the player throughout the conduct of the game;

awarding means for providing said award according to the step (j) to the player on the gaming machine.

13. The gaming machine of claim 12, further comprising communicating means for communicating with another gaming device remote from said gaming machine, the gaming device being responsible, through communication of a signal to the gaming machine, for at least one of:

the gaming machine initiating the game;

the prize to be awarded to the player in the game by the gaming machine; and the determination of at least one game characteristic influencing the conduct of the game on the gaming machine.

14. A non-transitory computer-readable medium having computer-executable instructions stored thereon, which when executed by a processor, causes the processor to perform a game comprising:

(a) providing using a displaying means of the gaming machine a representation of locations as an array, wherein each location has a position within the array, the locations having a spatial relationship with each of the other locations, and one of said locations of the array is designated as being a reference location;

(b) establishing a sequence for the locations of the array , the sequence establishing one subsequent location with respect to the reference location and at least one non-subsequent location with respect to the reference location, wherein the sequence of locations, being unknown by the player, is stored in a memory of the gaming machine;

(c) receiving from the player through an inputting means of the gaming machine a guessed spatial relationship of the subsequent location with respect to the reference location;

(d) revealing on the displaying means to the player the location in the array of the subsequent location according to the sequence stored in the gaming machine memory and consequently the spatial relationship of the subsequent location with respect to the reference location, namely an actual spatial relationship;

(e) evaluating the guessed spatial relationship as either correct or incorrect based on a comparison to the actual spatial relationship; and (f) evaluating fulfillment of a game-ending criterion, wherein non-fulfillment of the game-ending criterion results in:

(g) changing the reference location by designating the subsequent location which is last revealed as the reference location, the newly-designated reference location having a position different from the previously-designated reference location in the array, thereby generating new player perceivable probabilities of providing a correct player input when guessing of a spatial relationship of a new subsequent location with respect to the newly-designated reference location; and (h) repeating at least once the steps (c) to (f) using the reference location which is last designated;

while fulfillment of the game ending criterion results in:

(i) performing an outcome evaluation of the game against a pay schedule stored in the memory; and (j) providing an award to the player on the gaming machine based on the outcome evaluation of the game.

* * * * *